United States Patent Office 3,329,006
Patented July 4, 1967

3,329,006
APPARATUS FOR THE DETERMINATION OF COEFFICIENTS OF PERMEABILITY AND ELECTROOSMOTIC PERMEABILITY
Alexandr Mikhailovich Silkin, Moscow, U.S.S.R., assignor to Moskovskaja Selskokhozjaistvennaja Akademia "K.A. Timirjazev," Moscow, U.S.S.R.
Filed Sept. 11, 1964, Ser. No. 395,714
4 Claims. (Cl. 73—38)

The present invention relates to apparatus for investigation of aqua-physical properties of soil, and more exactly, to apparatus for the determination of the coefficients of peat permeability.

Oedometers and consolidometers are usually used for the determination of coefficients of permeability of peat under a load. But the said apparatus are complicated and are equipped with special mechanical, hydraulic or pneumatic devices for applying a load to the tested sample.

Moreover, for the determination of the coefficient of permeability of a peat base, for example, under dams, levees and other hydraulic structures, which apply a definite load onto the base, it is necessary to keep peat samples in oedometers and consolidometers under the equal load up to the value of compactness which should be obtained by the said peat base. The process requires several months.

In special permeameters now in use the coefficient of permeability is usually determined on undisturbed samples or on samples preconsolidated in consolidometers.

Furthermore, when determining the coefficient of permeability a peat sample is enclosed in a chamber with rigid walls and therefore the coefficient of permeability differs from the actual one due to considerable contact percolation.

When electro-osmotic properties are determined a peat sample settles under the action of electric current, passing through it.

Due to the settling of the sample a clearance is formed between the body of the apparatus and the sample. Thus, to determine the coefficient of electro-osmotic permeability in said apparatus is practically impossible.

The said disadvantages complicate the investigation of the aqua-physical properties of peat, hampering the designing and construction of structures on the peat base.

The present invention eliminates the disadvantages mentioned above.

The primary object of the present invention is to provide an apparatus which is simple in design, cheap in manufacturing, and which allows quick detemination of the coefficients of permeability of peat with definite compactness achieved in the said apparatus.

Another object of the invention is to provide an apparatus which makes it possible to eliminate contact percolation, thus increasing the accuracy in determination of the coefficient of permeability.

Further objects and advantages will be more apparent from the following description of the apparatus and the accompanying drawings, in which.

Figure 1:
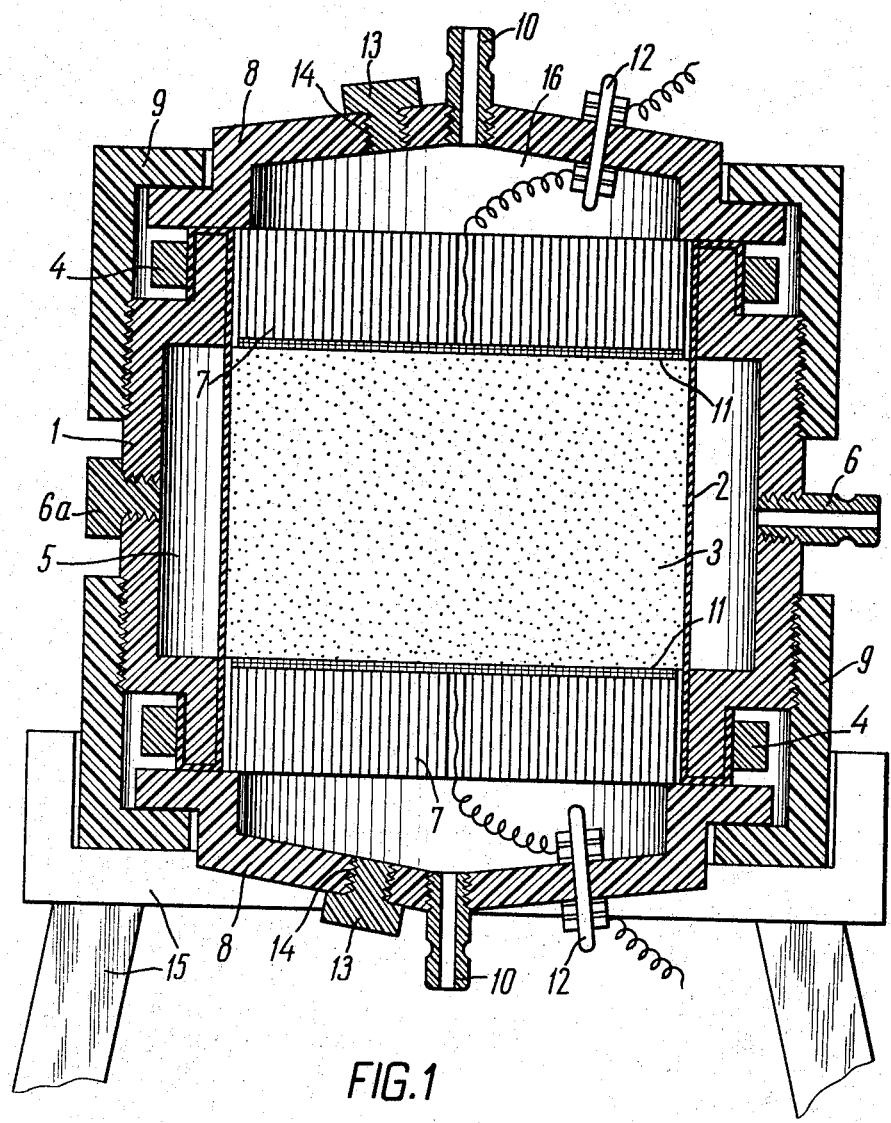
FIG. 1 is a cross-sectional view of the apparatus for the determination of the permeability coefficients and electroosmotic permeability of peat in which the required compactness is attained by means of changeable filters of various thickness.

According to the present invention the apparatus for determination of the coefficient of permeability comprises a cylindrical body 1 with cylindrical elastic skin 2 placed inside of said body and enclosing a sample 3, being tested. Skin 2 is fastened to body 1 with retaining rings 4.

A circular chamber 5 is formed beween the walls of body 1 and the cylindrical skin and is filled with water through sleeve 6 after a tested peat sample 3 is placed in skin 2.

The water presses the elastic skin against the sample side surface and thus the possibility of contact percolation is eliminated. The air in circular chamber 5 is bled upon filling with water and air is introduced when draining the chamber after the device has been operated, by means of a hole with plug 6a.

The tested peat sample is closed at the ends by filters 7, made of porous hard material with a high degree of permeability.

To ensure the necessary compactness of the sample, the apparatus is equipped with a set of filters of various thickness. Cap 8 with pressure nut 9, screwed on body 1, is set above filters 7.

Between the cap and the body of the apparatus rubber gaskets may be provided.

Sleeves 10 are arranged in the cap for admission and draining of water, seeping through tested sample 3. When determining the coefficient of electro-osmotic permeability, electrode nets 11 are placed between the filters and the sample. The nets are fed from a current supply source through terminals 12. To take the temperature of the delivered and drained water, the caps are provided with holes 14 for thermometers closed with plugs 13. The assembled apparatus is put on support 15.

The operation of the apparatus is as follows.

An undisturbed tested peat sample should be cut out with the help of a sampler.

The peat sample is carefully pressed out through the open end of the sampler into cylindrical skin 2 with the help of a special piston or punch.

After the sample is inserted into the skin, a filter 7 is arranged on the sample at both ends and closed with a corresponding cap 8. This done, the nuts are tightened up to press the cap against the body of the apparatus.

Then chamber 5 is filled with water through sleeve 6 by means of a rubber hose. Plug 6a, first removed from the hole in the body wall, is screwed in again after filling the chamber with water which presses the skin against the cylindrical side surface of the sample.

The water pressure in said chamber must be equal to or a little greater than that of the seepage water delivered to the apparaus. Due to the fact that elastic skin 2 is tightly pressed by water pressure against the side surfaces of the sample, the contact percolation is completely eliminated.

Seepage water is brought to the apparatus and drained off into a measuring glass through sleeves 10. The necessary water pressure is created by devices which are usually used for the determination of the coefficients of soil permeability.

The filter thickness is selected in accordance with the desired compactness of the sample to be obtained. A filter of a greater thickness is then inserted into the apparatus and a cap is placed upon it, which, being screwed on, moves the filter and is tightly pressed against body 1. The height of the tested sample is decreased by a value equal to the difference in the thickness of the filters used, i.e. the sample becomes more compact.

Therefore by inserting filters of various thickness, it is possible to obtain the required compactness of a sample in the apparatus during the time necessary only for replacing the filter of one thickness for another and for subsequent pressing of the cap against the body by screwing the cap on.

To obtain the required compactness of the sample it is not necessary to apply great efforts and to keep the sample under load for a longtime to make it compact as is usually the case when the coefficient of premeability is determined with the help of an oedometer or consolidometer.

When determining the coefficient of electro-osmotic permeability, electrode nets 11 are arranged between peat sample 3 and filters 7 during assembly, to which nets through terminals 12 electric current is fed from a power supply source.

Figure 2:
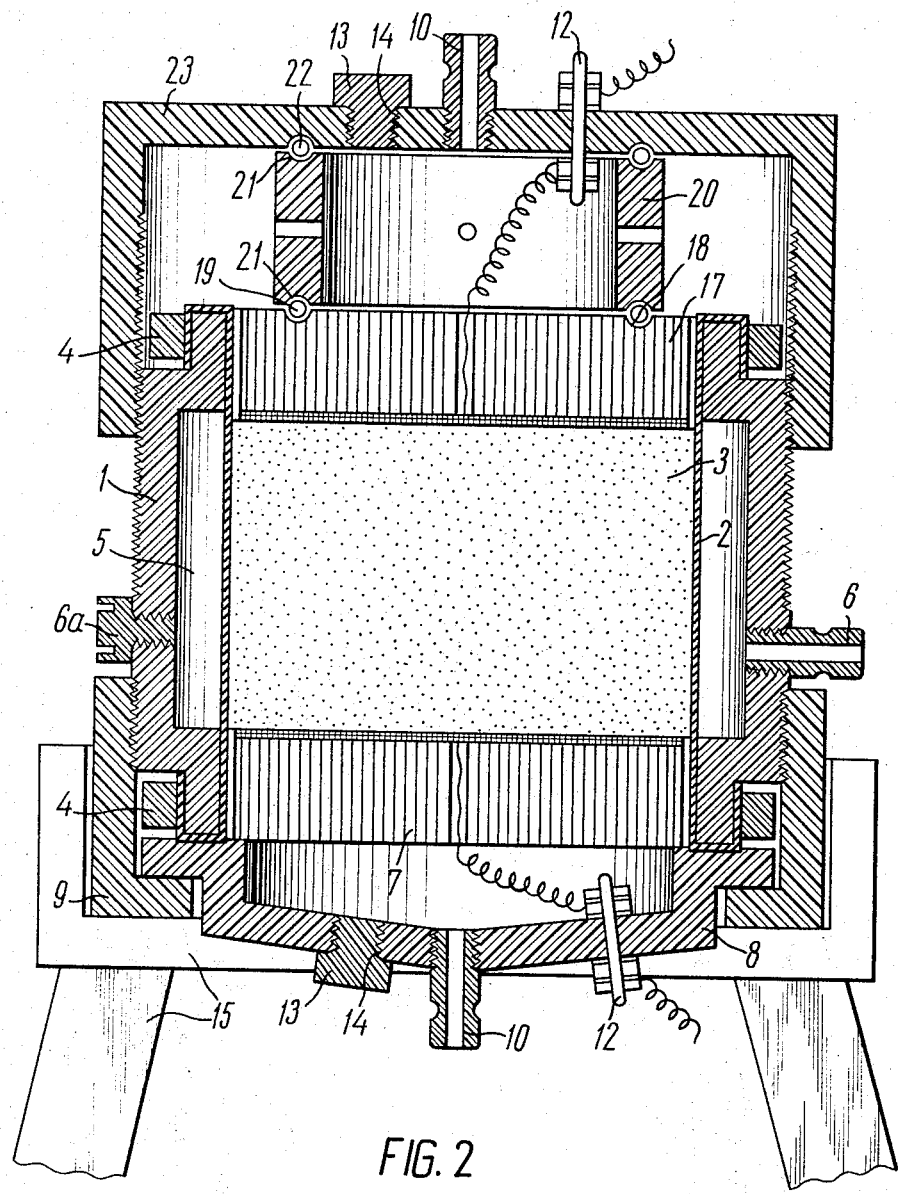
FIG. 2 is a modification of the apparatus in FIG. 1 in which the required compactness is attained with the aid of a cylindrical bush placed between a cap and a filter of the apparatus.
Figure 3:
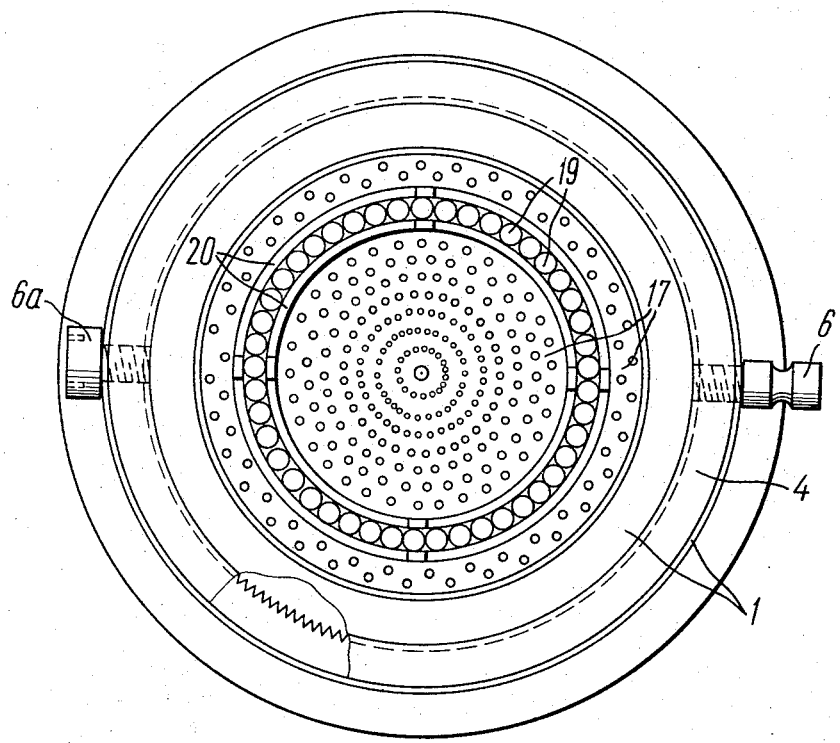
FIG. 3 is a top view of the same apparatus as in FIG. 2, with the cap and support removed.

The preparation and assembly of the apparatus in this case are the same as described above. FIGS. 2 and 3 show the apparatus which unlike the described one has a permanent filter 17 with a circular groove 18 in its upper part with a ball bearing 19 inserted in it. Mounted on the ball bearing is a cylindrical bushing 20 which has circular grooves 21 on both ends, similar to those of filter 17. Ball bearing 22 similar to ball bearing 19, are arranged in the circular groove on the upper part of cylindrical bushing 20. Above bushing 20 is mounted a cap 23 which can be screwed onto body 1 thus pressing the filter against the tested peat sample via bushing 20. By screwing cap 23 on body 1 with the help of bushing 20, it is possible to press the tested sample up to the required compactness without interrupting the test or replacing the filters.

A measuring rule and a pointer (not shown in the drawing) can be fixed on the side of pressure nut 9 to measure the thickness of the tested sample and to determine the compactness which it requires when cap 23 is being screwed on the body and pressed against the sample.

The assembled apparatus is put on support 15.

Preparation and assembly of the apparatus are similar to those described above, the difference being that after the peat sample has been inserted into the apparatus, filter 17 is placed on the sample in circular groove 18, ball bearings 19 are placed in groove 18, and bushing 20 with ball bearings 22 are placed thereon. Then cap 23 is carefully screwed on body 1 until it tightly bears upon ball bearings 22, which will be evident from the readings on the measuring rule which should correspond to the thickness of the tested sample. By means of a rubber hose the space between body 1 and skin 2 is filled with water through sleeve 6 as described for the apparatus shown in FIG. 1.

The value of sample compression (compactness) is fixed by means of the measuring rule, that is by the value of the rapprochement of cap 23 and nut 9.

In the broad sense the present invention is adapted for the determination of permeability coefficients and the electro-osmotic permeability of undisturbed peat samples with required compactness. However, the present invention does not exclude but envisages the possibility of the determination of the above mentioned coefficients for any mineral soils.

When embodying the invention it is preferable to use organic glass (plexiglass) or various current non-conductive plastics joined by gluing or punching. It should be noted that the present invention eliminates the errors in the determination of permeability coefficients and the electro-osmotic permeability due to complete elimination of contact percolation and gives the possibility to increase the compactness of the sample during the test.

All this permits to improve the study of aqua-physical properties of peat.

Furthermore, the invention makes it possible to determine the coefficient of permeability of drained peat-bogs, which is very important for calculation of drained areas, by selecting peat samples in peat-bogs yet undrained and by testing said samples in the described apparatus, taking into consideration the expected settlement which can be predetermined according to the well-known formulas for settlements of drained peat-bogs.

The present invention may be also used when investigating the conditions of applicability of the consolidation theory to peat in connection with a wide use of vertical sand drains, which speed up the consolidation settlement of the peat base in the building of roads, airfields, etc.

Though the present invention is described in connection with the preferred embodiment it is quite clear that modifications and alterations may be made without departing from the spirit and scope of the invention, as those skilled in the art will easily understand.

These changes are considered as falling within the spirit and scope of the invention if defined by the appended claims.

What is claimed is:

1. An apparatus for the determination of coefficients of permeability of soil comprising: a cylindrical body; two caps, one arranged at each end of said body; devices for moving said cylindrical caps along the body; an elastic skin, placed concentrically in said cylindrical body; a device for fastening said skin to the ends of said cylindrical body; a circular space defined between the internal walls of the cylindrical body and said elastic skin; a device for filling said circular space with water; a device for releasing the air from said space; a pair of movable filters placed within the ends of said elastic cylindrical skin at the ends of the cylindrical body and adapted for receiving a soil sample placed between said filters in said skin; one of said caps being constituted to transfer pressure through said filters to the sample when moving; said caps having internal surfaces defining spaces with the filters; and devices for feeding these spaces with water and for releasing the water out of said spaces.

2. An apparatus for the determination of coefficients of permeability of soil comprising: a cylindrical body; a screw thread on the outer surface of said body; two caps, one arranged at each end of the body; a pressure nut including an internal circular projection engaging a respective cap and a screw thread threadably engaging the outer side of the cylinder whereby the caps can be moved relative to the body by the nuts; an elastic skin, placed concentrically in the cylindrical body; a device for fastening said skin to the ends of the cylindrical body; a circular space defined between the internal walls of the cylindrical body and the elastic skin; a device for filling said circular space with water; a device for releasing the air from said space; a pair of movable filters placed within the ends of said elastic cylindrical skin at the ends of the cylindrical body and adapted for receiving a soil sample placed between said filters; one of said caps, when moving relative to the body applying pressure through said filters to the sample; said caps having internal surfaces defining spaces with the filters; and devices for feeding these spaces with water and for releasing the water out of the spaces.

3. An apparatus for the determination of coefficients of permeability of soil comprising: a cylindrical body, a screw thread on the outer surface of said body; two caps, one arranged at each end of the body; a pressure nut including an internal circular projection engaging a respective cap and a screw thread threadably engaging the outer side of the cylinder whereby the caps can be moved relative to the body by the nuts; an elastic skin, placed concentrically in the cylindrical body; a device for fastening said skin to the ends of the cylindrical body; a circular space defined between the internal walls of the cylindrical body and the elastic skin; a device for filling said space with water; a device for releasing the air from said space; a pair of movable filters placed within the ends of the elastic cylindrical skin at the ends of the cylindrical body and adapted for receiving a soil sample placed between said filters; said caps applying pressure through said filters to the sample when the nuts are moved; said caps having internal surfaces defining spaces with the filters; metal nets serving as electrodes, placed between the sample and the filters; and a device for supplying the nets with electric current.

4. An apparatus for the determination of coefficients of permeability of soil, comprising: a cylindrical body having opposite ends; a screw thread on the outer surface of said body; two caps, one arranged at each end of said body, one of said caps having cylindrical walls and a flat bottom, a screw thread at the end of the cylindrical wall threadably engaging said body for moving said cap relative to the body, the thread on said cap corresponding to that on the outer surface of the cylindrical body; an elastic skin, placed concentrically in the cylindrical body; a device for fastening said skin to the ends of the cylindrical body; a circular space defined between the internal walls of the cylindrical body and the elastic skin; a device for filling said circular space with water; a device for releasing the air from the said space; a pair of movable filters placed within the ends of the elastic cylindrical skin at the ends of the cylindrical body and adapted for receiving a soil sample to be tested placed between said filters; a hollow cylindrical member placed vertically between said one cap and a filter; bearings, placed between the adjacent ends of the cylindrical member and said one cap; a pressure nut including an internal circular projection engaging the other cap of the body and a screw thread threadably engaging the outer wall of the cylinder; said caps having internal surfaces defining spaces with the filters; devices for feeding these spaces with water and for releasing the water from the spaces; metal nets serving as electrodes and placed between the sample and the filters; and a device for supplying the nets with electric current.

References Cited

UNITED STATES PATENTS

| | | | |
|---|---|---|---|
| 966,078 | 8/1910 | Bowman | 73—38 |
| 2,498,198 | 2/1950 | Beeson | 73—38 |
| 2,745,057 | 5/1956 | Dotson | 324—13 |
| 2,830,266 | 4/1958 | Southwick | 324—13 |

LOUIS R. PRINCE, *Primary Examiner.*

WILLIAM A. HENRY II, *Assistant Examiner.*